April 6, 1954     C. J. COBERLY     2,674,126
FLUID-OPERATED FREE PUMP WITH FORMATION PRESSURE TESTER
Filed April 28, 1950     2 Sheets-Sheet 1
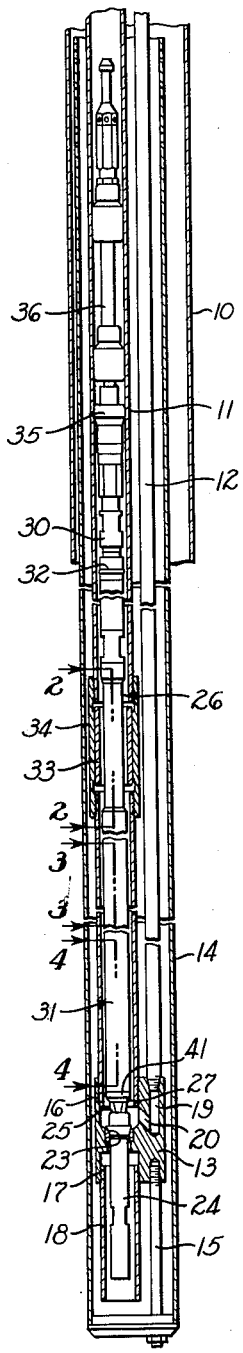
INVENTOR.
CLARENCE J. COBERLY
BY HIS ATTORNEYS.
HARRIS, KIECH, FOSTER & HARRIS
BY April 6, 1954 C. J. COBERLY 2,674,126
FLUID-OPERATED FREE PUMP WITH FORMATION PRESSURE TESTER
Filed April 28, 1950 2 Sheets-Sheet 2

INVENTOR.
CLARENCE J. COBERLY
BY HIS ATTORNEYS.
HARRIS, KIECH, FOSTER & HARRIS

Patented Apr. 6, 1954

2,674,126

UNITED STATES PATENT OFFICE 2,674,126

FLUID-OPERATED FREE PUMP WITH FORMATION PRESSURE TESTER

Clarence J. Coberly, Los Angeles, Calif., assignor, by mesne assignments, to Dresser Equipment Company, Cleveland, Ohio, a corporation of Ohio Application April 28, 1950, Serial No. 158,891

10 Claims. (Cl. 73—155)

The present invention relates to an apparatus for determining the fluid level in a well and, more particularly, to an apparatus for determining the bottom hole or formation pressure in the well. Since the invention finds particular utility in the oil industry, it will be considered in such connection herein as a matter of convenience, although it will be understood that the invention is susceptible of various other applications.

In any oil well pumping operation, it is frequently desirable to determine the bottom hole or formation pressure obtaining in the well for various pumping rates, this being done to check on the performance of the well, the performance of the pump, etc. In order to obtain data having any significance, it is essential that the formation pressures for various pumping rates be determined substantially without altering conditions prevailing in the well and in the pump, except for variations in formation pressure which may result from pumping at different rates. With this in mind, sonic methods for determining the formation pressure have been employed since such methods do not require removing the pump from the well. In essence, any sonic determination of this nature involves measuring the length of time required for sound to travel from the surface of the ground to the surface of the fluid in the well and back to the surface of the ground. From this, the level of the surface of the fluid below the surface of the ground may be determined. However, in most oil wells, the fluid in the well is a frothy liquid containing substantial quantities of gas and any sonic method merely determines the level of the surface of the frothy liquid. Consequently, any sonic method will provide an apparent fluid level which cannot be related to the formation pressure without some means of determining the density of the frothy liquid. In order to do this, it is necessary to back pressure the casing by increments to compact the frothy liquid in the well, the level of the surface of the frothy liquid being determined for each increment of back pressure. By making a number of determinations in this manner, it is possible to determine the approximate density of the frothy liquid and, knowing the approximate density, the formation pressure can be determined. However, determining the formation pressure in this manner is complicated and requires a considerable length of time, all of which is undesirable.

In order to avoid the difficulties accompanying sonic methods of determining the formation pressure, the formation pressure may be determined with a pressure measuring device comprising, for example, a clock-operated chart and a pressure gauge having means for recording the formation pressure on the chart, the clock having, for example, a twenty-four, forty-eight, or seventy-two hour time base. Such a device is conventionally termed a pressure bomb and is well known in the art. Conventionally, a pressure bomb is run into the well on a wire line to a point adjacent the pump to obtain the formation pressure prevailing at approximately the level of the pump. Running a pressure bomb into the well on a wire line between the casing and tubing or tubings associated with the pump is a difficult and hazardous operation since the wire line may spiral around the tubing or tubings to such an extent that it cannot be removed, or the pressure bomb may become wedged between the tubing or tubings and the casing. Consequently, in an installation incorporating a rod-operated pump, or a fluid-operated pump which is connected to the lower end of one of the tubings, it is necessary to pull the entire installation from the well before the bomb can be run in. Subsequently, the pump must be reinstalled so that the formation pressure can be determined for various pumping rates. Subsequently, in order to remove the pressure bomb, it is necessary to again pull and reinstall the pump. As will be apparent, pulling and re-running the pump and the tubings and/or rods involves a substantial expense, which is a disadvantage of this method. Another disadvantage is that this method requires a substantial length of time for pulling and re-running the pump and conditions in the well may be altered materially during this interval. Still another disadvantage is that, when the pump is pulled, the fluid in the tubing or tubings is discharged into the well and this backwashing of fluid into the well may be sufficiently severe to materially affect the productive capacity of the sand face in the well, thereby materially altering the formation pressure which it is desired to determine. Also, in the event that the passages in the pump are partially obstructed with sand or other foreign matter, such backwashing of the fluid from the tubings frequently clears such passages so that, when the formation pressure test is subsequently made, results quite different from those which were anticipated when the necessity for the test was indicated are obtained. As will be apparent, all of this renders the pressure bomb method unsatisfactory when practised in the manner indicated.

In view of the foregoing, a primary object of the present invention is to provide a method of determining formation pressures with a pressure bomb which avoids the difficulties outlined above.

In accordance with the present invention, I attain the foregoing primary object by providing an apparatus for determining the formation pressure in the well which includes a fluid-operated pump of the so-called "free" type, i. e., a fluid-operated pump of the type which is movable hydraulically through a tubing in the well between the surface of the ground and an operating position adjacent the lower end of such tubing, and which includes a pressure measuring means, such as a pressure bomb, connected thereto, the pressure bomb being connected to the lower end of the pump and being exposed to the formation pressure in the well when the pump is in its operating position.

By combining a fluid-operated free pump with a pressure bomb in this manner, the present invention provides a formation pressure tester which may be installed in the well in a comparatively short interval of time and at relatively little expense. Also, in accordance with the present invention, there is no necessity for discharging the fluid in the pump tubings into the well so that the deleterious backwashing effects discussed above are avoided.

In a typical fluid-operated free pump installation, two pump tubings are employed, one of these being a power tubing for conveying an operating fluid under pressure downwardly into the well to operate the pump and the other being a production tubing for conveying fluid discharged by the pump upwardly in the well to the surface of the ground. The fluid-operated free pump may be movable through either one of the two tubings, although the usual practice is to provide an installation wherein the pump is movable through the power tubing and such an installation will be considered herein for convenience. In order to separate the columns of fluid in the power and production tubings, it is customary to provide in the power tubing above the point where the two tubings are connected in fluid communication a sealing collar which is adapted to be engaged by a packing means on the pump. However, when a pressure bomb is connected to the lower end of the pump in accordance with the present invention, the packing means mentioned is positioned above the sealing collar when the pump is in its operating position and an important object of the present invention is to provide an alternative packing means for separating the power and production columns when the pump is used in conjunction with a pressure bomb.

Another object in connection with the foregoing is to provide a packing means which engages the power tubing at a point above the sealing collar to separate the power and production columns.

As will be apparent, the formation pressure in the well at the level of the operating position of the pump may be relatively low as compared to the pressure at the same level in the tubing through which the pump and pressure bomb are run because of the fact that the head of fluid in the tubing is equal to the distance between the operating position of the pump and the surface of the ground, whereas the head of fluid in the casing may be much less than this. In order to determine the formation pressure in the well more accurately, it is desirable to use a pressure bomb having a pressure measuring means with a range commensurate with the formation pressure to be measured. For example, the range of the pressure measuring means might be as low as 500 pounds per square inch, or even as low as 100 pounds per square inch. Obviously, the pressure in the tubing through which the pump and pressure bomb are run may be much higher than this at the level of the operating position of the pump and an important object of the present invention is to provide means for preventing exposure of the pressure measuring means to such higher pressure so as to avoid damage thereto.

More specifically, an object of the invention is to provide means for preventing exposure of the pressure measuring means to pressures above a predetermined maximum value.

Another object is to provide a formation pressure tester wherein the pressure measuring means is exposed to the formation pressure through a passage having a control valve associated therewith, the operation of the control valve being regulated by a pressure responsive means exposed to the pressure in the passage in such a manner that the control valve closes the passage to the pressure measuring means as long as such pressure is above a predetermined maximum value. With this construction, any possibility of damage to the pressure measuring means due to excessive pressures is avoided, which is an important feature of the invention.

The foregoing objects and advantages of the present invention, together with various other objects and advantages thereof which will become apparent, may be attained through the employment of the exemplary embodiment of the invention which is illustrated in the accompanying drawings and which is described in detail hereinafter.

Referring to the drawings:

Fig. 1 is a utility view illustrating the present invention as installed in a well;

Fig. 2 is an enlarged, vertical sectional view which is taken along the broken line 2—2 of Fig. 1;

Figure 3:
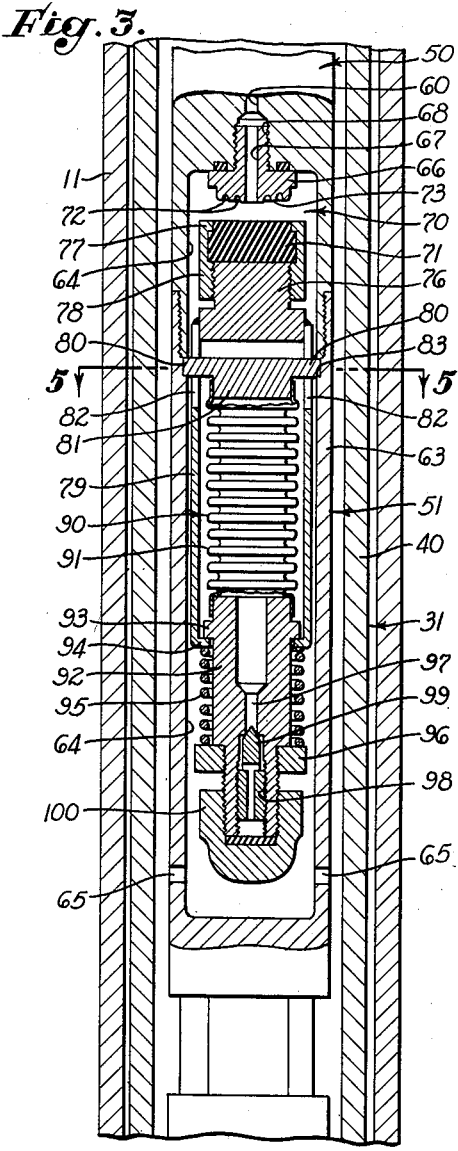
Fig. 3 is a downward continuation of Fig. 2 and is taken along the broken line 3—3 of Fig. 1.
Figure 4:
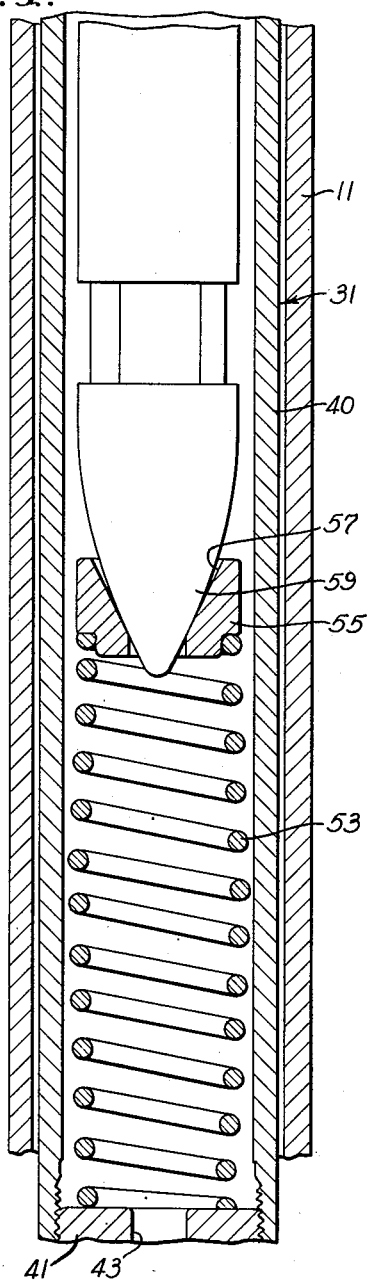
Fig. 4 is a downward continuation of Fig. 3 and is taken along the broken line 4—4 of Fig. 1.
Figure 5:
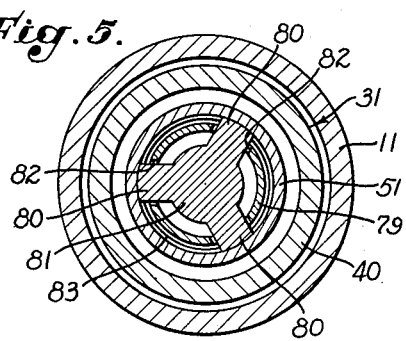
Fig. 5 is a transverse sectional view taken along the broken line 5—5 of Fig. 3.

Referring particularly to Fig. 1, the numeral 10 designates a casing which is set in an oil well with its lower end open to a producing formation surrounding the well so that fluid from the formation may flow into the casing. Set in the casing are power and production tubings 11 and 12 which are threaded at their lower ends into a fitting 13. In the particular construction illustrated, the lower ends of the power and production tubings 11 and 12 and the fitting 13 are enclosed by a gas anchor 14 which is connected to the fitting by a bolt 15. The fitting 13 is provided with a bore therethrough having at its upper end a counterbore 16 into which the lower end of the power tubing 11 is threaded and having at its lower end a counterbore 17 into which an inlet tubing 18 is threaded. The fitting 13 is also provided with a bore 19 into which the lower end of the production tubing 12 is threaded, the bore 19 communicating through a lateral passage 20 with the counterbore 16. Seated on a seat 23 which encompasses the bore through the fitting 13 and extending downwardly into the inlet tubing 18 is a standing valve assembly 24 through which well fluid may flow from the well, the standing valve assembly including a standing valve, not shown, which prevents reverse flow from the tubings 11 and 12 into the well.

The standing valve assembly 24 provides at its upper end a seat 25 for an apparatus 26 for determining the formation pressure obtaining in the well at various pumping rates, the apparatus 26 being movable hydraulically through the power tubing 11 between the surface of the ground and an operating position wherein it is seated on the seat 25. The apparatus 26 may be moved downwardly through the power tubing 11 into its operating position by the action of gravity, or by the application of fluid pressure to the upper end thereof, any fluid in the power tubing below the apparatus being displaced upwardly through the production tubing 12 because of the action of the standing valve in the standing valve assembly 24, which prevents back flow into the well. In order to move the apparatus 26 upwardly through the power tubing 11 to the surface of the ground, it is merely necessary to apply fluid pressure to the lower end thereof through the production tubing 12 and the lateral passage 20, the standing valve in the standing valve assembly 24 again preventing back flow into the well. When the pressure is applied to the lower end of the apparatus 26 through the production tubing 12 to remove the apparatus from the well, such pressure initially acts on an annular area 27 at the bottom of the apparatus to unseat the apparatus, the fluid pressure thereafter acting upon the entire cross-sectional area of the apparatus to move it upwardly through the power tubing 11 to the surface of the ground.

The apparatus 26 for determining the formation pressure includes a fluid-operated free pump 30, which may be of any suitable type, such as that illustrated in my Patent No. 2,338,903, issued January 11, 1944. The apparatus 26 also includes a pressure measuring device 31 which is connected to the lower end of the fluid-operated free pump 30 and which is adapted to seat on the seat 25. The pump 30 is adapted to be operated in the usual manner by an operating fluid, usually clean crude oil, under relatively high pressure which is conveyed downwardly into the well to the pump by the power tubing 11. As will be discussed in more detail hereinafter, the well fluid to be pumped by the pump 30 is conveyed thereto through the pressure measuring device 31, the fluid discharged by the pump flowing through the lateral passage 20 in the fitting 13 and being conveyed upwardly to the surface of the ground as production fluid by the production tubing 12.

In a free pump installation of the character described, it is necessary to provide some means for separating the columns of power and production fluids in the power and production tubings 11 and 12. During normal usage of the pump 30, i. e., without the pressure measuring device 31, such separation of the power and production columns is effected by a packing means 32 on the pump 30, the packing means 32 preferably being a simple O-ring. The O-ring 32 is adapted to engage a liner 33 pressed into a sealing collar 34 in the line of the power tubing 11 when the pump 30 per se is seated on the seat 25, the sealing collar having the form of a coupling connecting two sections of the power tubing. However, when the pump 30 is combined with the pressure measuring device 31 to form the apparatus 26 for determining the formation pressure in the well, the O-ring 32 is disposed a considerable distance above the sealing collar 34 so that it no longer serves to separate the power and production columns. Consequently, it is necessary to provide an alternative packing means 35 for separating the power and production columns when the pump 30 and pressure measuring device 31 are used in combination, which is a feature of the invention. The packing means 35 is carried by a packer mandrel 36 which is carried by and extends upwardly from the body of the pump 30, the packing means 35 being adapted to withstand the pressure differential between the power and production column for a length of time sufficient to conduct the formation pressures tests. As will be apparent from Fig. 1, the packing means 35 engages the power tubing 11 at a point above the sealing collar 34 when the apparatus 26 is in its operating position wherein it is seated on the seat 25. A packing means suitable for use as the packing means 35 is disclosed in detail in application Serial No. 138,909, filed January 16, 1950, by Ralph F. McArthur.

Referring to Figs. 2 to 5 for a consideration of the details of the pressure measuring device 31, it includes a tubular housing 40 which is threaded at its upper end onto the lower end of the pump 30 and which is threaded at its lower end onto an element 41 which is adapted to seat on the seat 25. The tubular housing 40 communicates at its upper end with an inlet 42 of the pump 30 and communicates at its lower end with a passage 43 in the element 41, well fluid being adapted to flow through the standing valve assembly 24 into the lower end of the tubular housing 40 by way of the passage 43, and subsequently flowing upwardly through the tubular housing into the inlet 42 of the pump 30.

Resiliently and floatingly mounted in the tubular housing 40 are a means 50 for measuring the pressure of the well fluid flowing through the tubular housing to the inlet 42 of the pump 30 (which pressure is substantially the formation pressure of the well adjacent the apparatus 26) and a means 51 for exposing the pressure measuring means 50 to the fluid pressure obtaining in the tubular housing 40 whenever such pressure is below a predetermined maximum value. The resilient and floating mounting for the pressure measuring means 50 and the pressure exposing means 51 is provided by compression springs 52 and 53, the former being seated against the lower end of the pump 30 and against a spring seat 54 which engages the upper end of the pressure measuring means 50, and the latter being seated against the element 41 and against a spring seat 55 which engages the lower end of the pressure exposing means 51. The spring seats 54 and 55 are provided with tapered seats 56 and 57, respectively, which receive complementary tapered portions 58 and 59, respectively, of the pressure measuring means 50 and the pressure exposing means 51. With this mounting for the pressure measuring means 50 and the pressure exposing means 51, transmission to the pressure measuring means 50 and the pressure exposing means 51 of any vibrations attributable to the pump 30, or to other sources, is minimized, which is a feature of the invention.

The pressure measuring means 50, which is not disclosed in detail, may be of any suitable type and may, for example, be a conventional pressure bomb incorporating a clock-operated chart together with a pressure gauge having means for continuously recording pressure on the chart as a function of time. As shown in Fig. 3, the pressure to be measured is communicated to the pressure measuring means 50 through a bore 60 which forms part of a passage means for connecting the pressure measuring means to the interior of the tubular housing 40.

Referring particularly to Fig. 3, the pressure exposing means 51 includes a housing 63 which is threadedly connected at its upper end to the lower end of the pressure measuring means 50, the housing 63 and the pressure measuring means providing a chamber 64 which communicates at its lower end with the interior of the tubular housing 40 through radial ports 65. The chamber 64 communicates at its upper end with the bore 60 in the pressure measuring means 50 through a valve seat element 66 having a passage 67 therethrough, the valve seat element being threaded into a counterbore 68 in the pressure measuring means. The bore 60 in the pressure measuring means, the passage 67 through the valve seat 66, the chamber 64, the ports 65, the tubular housing 40, the passage 43 through the element 41 and the passage through the standing valve assembly 24 collectively define a passage means which provides fluid communication between the pressure measuring means and the well.

The pressure exposing means 51 includes valve means 70 for opening and closing the aforementioned passage between the pressure measuring means 50 and the well, one element of the valve means being the valve seat element 66. The valve means 70 also includes a valve element 71 which is adapted to engage the valve seat element 66 to close the passage to the pressure measuring means 50. In the particular construction illustrated, the valve element 71 is formed of a material such as oil-resistant rubber and the valve seat element is provided with annular grooves 72 therein which form an annular ridge 73, the valve element 71 being adapted to seat on the ridge 73 to provide a fluid-tight seal.

The valve element 71 is clamped between a plug member 76 and an inturned annular flange 77 on a retaining collar 78 which is threaded onto the plug member 76. Telescoped over and soldered or otherwise connected to the lower end of the plug member 76 is a sleeve 79 which is movable vertically in the chamber 64 to move the valve element 71 into and out of engagement with the valve seat element 66, the sleeve 79 being guided for vertical movement by radial fingers 80 on a guide element 81. The radial fingers 80 extend through elongated vertical slots 82 in the sleeve 79 and the guide element 81 is secured relative to the housing 63 by clamping the ends of the radial fingers 80 between an internal annular shoulder 83 on the housing 63 and the lower end of the pressure measuring means 50. As shown in Fig. 3, the pressure exposing means 51 includes means 90 responsive to the fluid pressure in the passage leading to the pressure measuring means 50 for moving the valve element 71 into engagement with the valve seat element 66 to close the passage to the pressure measuring means 50 in the event that the pressure in such passage between the valve means 70 and the well exceeds a predetermined maximum value, thereby preventing damage to the pressure measuring means 50 from excessive pressure, which is an important feature of the invention. The pressure responsive means 90 includes a bellows 91 which is secured at its upper end to and is closed at its upper end by the guide element 81. The bellows 91 is secured at its lower end to and is closed at its lower end by a closure element 92 having an external annular flange 93 thereon which is adapted to engage an inturned annular flange 94 at the lower end of the sleeve 79. The inturned flange 94 on the sleeve 79 is biased into engagement with the flange 93 on the closure element 92 by a compression spring 95 which is seated at its upper end against the flange 94 and at its lower end against a collar 96 threaded onto the closure element 92. As will be apparent, with this construction, as the bellows 91 expands, the valve element 71 moves away from the valve seat element 66 to open the passage to the pressure measuring means 50 and, as the bellows 91 contracts, the valve element moves toward the valve seat element to close the passage to the pressure measuring means.

The closure element 92 is provided with a passage therethrough through which the bellows 91 may be filled with fluid at the desired pressure, such passage including a bore 97 and a counterbore 98 and being closed by a needle valve 99 adapted to seat on the shoulder formed at the junction of the counterbore 98 with the bore 97. The needle valve 99 is threaded into the counterbore 98 and the lower end of the counterbore 98 is closed by a cap 100 which is threaded onto the lower end of the closure element 92.

Considering the operation of the invention, it will be assumed that the well is being pumped in the normal manner by the fluid-operated free pump 30, i. e., is being pumped by the fluid-operated free pump 30 minus the pressure measuring device 31, when the desirability of making a formation pressure survey is indicated. Under such conditions, the first operation to be performed is to remove the pump 30 from the well, which is readily accomplished by directing the operating fluid downwardly through the production tubing 12, rather than through the power tubing 11, by means of a suitable valve mechanism, not shown, on the surface of the ground. The operating fluid introduced into the system through the production tubing 12 in this manner moves the pump 30 upwardly through the power tubing 11 to the surface, at which point it may be removed from the power tubing in any suitable manner as is well known in the art. It should be noted that, during the operation of removing the pump 30 from the well, the standing valve assembly 24 prevents discharge of fluid from the tubings 11 and 12 into the well so that there is no backwashing effect on the pump or on the formation surrounding the well.

After the pump 30 has been removed from the well, the pressure measuring device 31 may be connected thereto to form the apparatus 26 for determining the formation pressure in the well. Alternatively, an apparatus 26 incorporating the pressure measuring device 31 and another fluid-operated free pump 30 having the packing means 35 thereon may be employed. The next operation is to run the apparatus 26 downwardly through the power tubing 11 into its operating position at the lower end thereof wherein it is seated on the seat 25. It will be noted that, as the apparatus 26 is run in, the pressure responsive means 90 automatically closes the valve means 70 if the pressure in the tubing 11 attains the predetermined maximum value for which the bellows 91 is pressurized. This prevents damage to the pressure measuring means 50, which is an important feature.

After the apparatus 26 has been run into its operating position in the foregoing manner, operating fluid under pressure is delivered to the pump 30 through the power tubing 11 in the usual manner, the packing means 35 serving to separate the power and production columns under such circumstances. Operating fluid under pressure is delivered to the pump 30 for a sufficient length of time to cause the pump to operate a few strokes. As a result, the pump draws fluid from the tubular housing 40 and discharges it into the production tubing 12, thereby reducing the pressure in the tubular housing 40 to a value slightly less than the formation pressure in the well so that the standing valve in the standing valve assembly 24 opens. If the delivery of operating fluid under pressure to the pump 30 is then terminated, the pump stops, whereupon the fluid pressure in the tubular housing 40 becomes the formation pressure in the well. The pressure measuring means 50 then records the static or shut-in formation pressure of the well, assuming that the well has been shut down for a sufficient length of time to allow this pressure to build up to its maximum value and assuming that such maximum value does not exceed the predetermined maximum value for which the pressure responsive means 90 is set.

After obtaining the static or shut-in pressure of the well in the foregoing manner, the pump 30 is then operated at several different speeds by delivering operating fluid under pressure thereto at different rates and is allowed to operate at each speed for a sufficient length of time to permit the well conditions to stabilize, formation pressure readings automatically being obtained by the pressure measuring means 50 for each pumping rate. The maximum speed at which the pump 30 is operated may be that at which the pumping rate exceeds the productive capacity of the well, or it may be the maximum permissible rate for the particular pump used. After the formation pressures have been recorded by the pressure measuring means 50 for various pumping rates in the foregoing manner, the pump 30 may be shut down for a sufficient length of time for the fluid level in the well to build up again to its static or shut-in value. Thereafter, the apparatus 26 may be removed from the well in substantially the manner hereinbefore described.

As will be apparent, the time required for removing the pump 30 from the well preparatory to making the formation pressure survey, running in the apparatus 26 for the survey, removing the apparatus 26 and re-running the pump 30 is extremely short as compared to methods requiring removal and re-running of tubings, rods, or the like. As previously pointed out, this short time interval, and particularly the short time interval required to remove the pump 30 and run in the apparatus 26, is extremely important since it insures that conditions in the well will not change materially between the time that the necessity for the formation pressure survey is indicated and the time that the formation pressure survey is actually made.

Also, the operations of removing the pump 30, running in the apparatus 26, removing the apparatus 26 and re-running the pump can be accomplished with a minimum expenditure for labor, which is an important item.

Another feature of the invention is that, at no time during the operations of removing and running in the pump 30 and the apparatus 26, is there any discharge of fluid from the pumping system into the well. This eliminates any backwashing effect on the pump and on the well formation, which is an important feature.

Although I have disclosed an exemplary embodiment of the invention herein for purposes of illustration, it will be understood that various changes, modifications and substitutions may be incorporated in the specific embodiment disclosed without departing from the spirit of the invention.

I claim as my invention:

1. In an apparatus for determining the fluid pressure obtaining in a well, the combination of: a well pump having an inlet for fluid to be pumped from the well; a tubular housing connected at one end to the lower end of said pump, said one end of said tubular housing communicating with the inlet of said pump and the other end thereof being adapted to communicate with the well; pressure measuring means disposed in said tubular housing; and means disposed in said tubular housing and connected to said pressure measuring means for exposing said pressure measuring means to the fluid pressure obtaining in said tubular housing.

2. An apparatus as set forth in claim 1 wherein the means last defined includes: means defining a passage communicating at one end with said pressure measuring means and at its other end with said tubular housing; valve means for opening and closing said passage; and pressure responsive means exposed to the fluid pressure in said passage intermediate said valve means and said tubular housing and operatively connected to said valve means for moving said valve means to its closed position to close said passage in the event that the fluid pressure in said passage intermediate said valve means and said tubular housing exceeds a predetermined maximum value.

3. An apparatus according to claim 2 wherein said pressure responsive means includes a bellows connected to said valve means.

4. An apparatus as defined in claim 1 including means for resiliently mounting said pressure measuring means and said exposing means in said tubular housing.

5. In an apparatus for determining the fluid pressure obtaining in a well, the combination of: a well pump having an inlet for fluid to be pumped from a well; a housing connected at one end to the lower end of said pump, said housing having means defining a passage extending longitudinally therethrough and communicating at its upper end with said inlet of said pump, the lower end of said passage being adapted to communicate with the well to admit well fluid from the well to said inlet of said pump by way of said passage when the apparatus is disposed in the well; pressure measuring means disposed in said housing; means defining a second passage in said housing communicating with the first passage defined therein and with said pressure measuring means; valve means in said second passage for opening and closing same; and pressure responsive means exposed to the fluid pressure upstream from said valve means and operatively connected to said valve means for moving said valve means to its closed position to close said second passage in the event that the fluid pressure to which said pressure responsive means is exposed exceeds a predetermined maximum value.

6. An apparatus according to claim 5 wherein said pressure responsive means includes a bellows connected to said valve means.

7. A combined well pumping and inlet pressure measuring apparatus, comprising: a pump having an elongated inlet tube at its lower end, and pressure measuring means in said inlet tube, said pressure measuring means being of less diameter than the inside of said inlet tube whereby the inlet passageway to said pump is substantially unobstructed, said pressure measuring means being responsive to the pressure within said inlet tube.

8. A combination as defined in claim 7, including means in said inlet tube for rendering said pressure measuring means non-responsive to pressure in said inlet tube when said pressure exceeds a predetermined value.

9. In an apparatus for determining the fluid pressure obtaining in a well; the combination of, a fluid-operated free pump having an inlet for fluid to be pumped from a well; a housing connected at one end to the lower end of said pump, said housing having means defining a passage extending longitudinally therethrogh and communicating at its upper end with said inlet of said pump, the lower end of said passage being adapted to communicate with the well to admit well fluid from the well to said inlet of said pump by way of said passage when the apparatus is disposed in the well, said passage being substantially unobstructed to the flow of such well fluid therethrough; pressure measuring means disposed in said housing and having an intake opening adapted to communicate with such well fluid of the well; and pressure exposing means in said housing and connected to said measuring means and having valve means adapted to open and close said intake opening, and having pressure responsive means in said housing and exposed to the fluid pressure upstream from said valve means and operatively connected to said valve means and adapted to move said valve means to its closed position to close said intake opening when said fluid pressure exceeds a predetermined pressure and to move said valve means to its open position to open said intake opening when said fluid pressure drops below a predetermined pressure.

10. An apparatus according to claim 9 wherein said pressure measuring means and said pressure exposing means are resiliently mounted in said housing.

References Cited in the file of this patent

UNITED STATES PATENTS

| Number | Name | Date |
| --- | --- | --- |
| 1,307,685 | Letord | June 24, 1919 |
| 2,158,569 | Bowen | May 16, 1939 |
| 2,184,689 | Savitz | Dec. 26, 1939 |
| 2,219,512 | Cooper et al. | Oct. 29, 1940 |
| 2,222,829 | Humason et al. | Nov. 26, 1940 |
| 2,280,785 | Boynton | Apr. 28, 1942 |
| 2,338,903 | Coberly | Jan. 11, 1944 |
| 2,360,041 | Dale | Oct. 10, 1944 |
| 2,360,742 | Toth et al. | Oct. 17, 1944 |
| 2,466,071 | Barnes, Jr. et al. | Apr. 5, 1949 |

OTHER REFERENCES

Publication, "Oil & Gas Journal," vol. 34, Oct. 17, 1935, article by Harold K. Ihrig, p. 32.